United States Patent
Gerber et al.

[15] 3,672,661
[45] June 27, 1972

[54] METHOD FOR SPREADING SHEET MATERIAL

[72] Inventors: Heinz Joseph Gerber; David R. Pearl, both of West Hartford, Conn.

[73] Assignee: Gerber Garment Technology, East Hartford, Conn.

[22] Filed: Feb. 2, 1970

[21] Appl. No.: 7,545

Related U.S. Application Data

[62] Division of Ser. No. 821,780, May 5, 1969, Pat. No. 3,495,492.

[52] U.S. Cl..............................................270/31, 270/69
[51] Int. Cl.......................................................B65h 29/46
[58] Field of Search..........................270/31, 30, 69; 271/74; 226/95; 83/374, 451; 269/21

[56] References Cited

UNITED STATES PATENTS

| | | | |
|---|---|---|---|
| 3,272,351 | 9/1966 | Burton et al. | 271/74 X |
| 3,202,302 | 8/1965 | Insolio | 271/74 X |
| 3,140,030 | 7/1964 | Stewart | 271/74 X |
| 2,539,240 | 1/1951 | Firestone | 83/374 X |
| 3,294,392 | 12/1966 | Dunham | 83/451 |

Primary Examiner—Robert W. Michell
Assistant Examiner—L. R. Oremland
Attorney—McCormick, Paulding & Huber

[57] ABSTRACT

Garment fabric or other similar flexible sheet material is spread from a roll or bolt of the same onto a table for subsequent cutting and/or other work to be performed thereon, and in such spreading may be spread into a multi-layer layup by passing the roll or bolt and the associated spreading tool back and forth many times along the length of the table. As the roll or bolt and the associated spreading tool move relative to the table a vacuum is created adjacent at least that portion of the table surface which receives the newly spread portion of the sheet material so as to aid in eliminating wrinkles and in otherwise achieving a more uniform and desireable arrangement of the material on the table.

5 Claims, 4 Drawing Figures

PATENTED JUN 27 1972

INVENTORS
HEINZ JOSEPH GERBER
DAVID R. PEARL

BY McCormick, Paulding & Huber

ATTORNEYS

INVENTORS
HEINZ JOSEPH GERBER
DAVID R. PEARL
BY
*McCormick, Paulding & Huber*
ATTORNEYS 3,672,661

METHOD FOR SPREADING SHEET MATERIAL

CROSS REFERENCE TO RELATED APPLICATION

This application is a division of copending application, Ser. No. 821,780, now U.S. Pat. No. 3,495,492, filed May 5, 1969 for Apparatus for Working on Sheet Material.

BACKGROUND OF THE INVENTION

This invention relates to methods involved in the manufacture of garments, upholstery and other items from fabric and other sheet material, and deals more particularly with an improved method for spreading such sheet material from a roll or other supply of the same onto a work table preparatory to cutting or other operation.

SUMMARY OF THE INVENTION

In accordance with the invention sheet material is spread onto a work table by paying it out from a roll or other supply of the same and progressively laying it onto the table surface by moving the point at which the material encounters the table, or previously spread layers of the same, along the length of the table, as by use of a conventional spreading tool. As the material is so spread a vacuum is applied to the table surface adjacent at least a portion thereof which includes, and extends a substantial distance forwardly and rearwardly of, said point at which the material encounters the table thereby drawing the newly spread material toward the table surface. The table may be divided into a number of lengthwise regions and vacuum may be selectively applied to only those regions including or adjacent to said point of encounter.

DETAILED DESCRIPTION OF PREFERRED EMBODIMENTS

Figure 1:
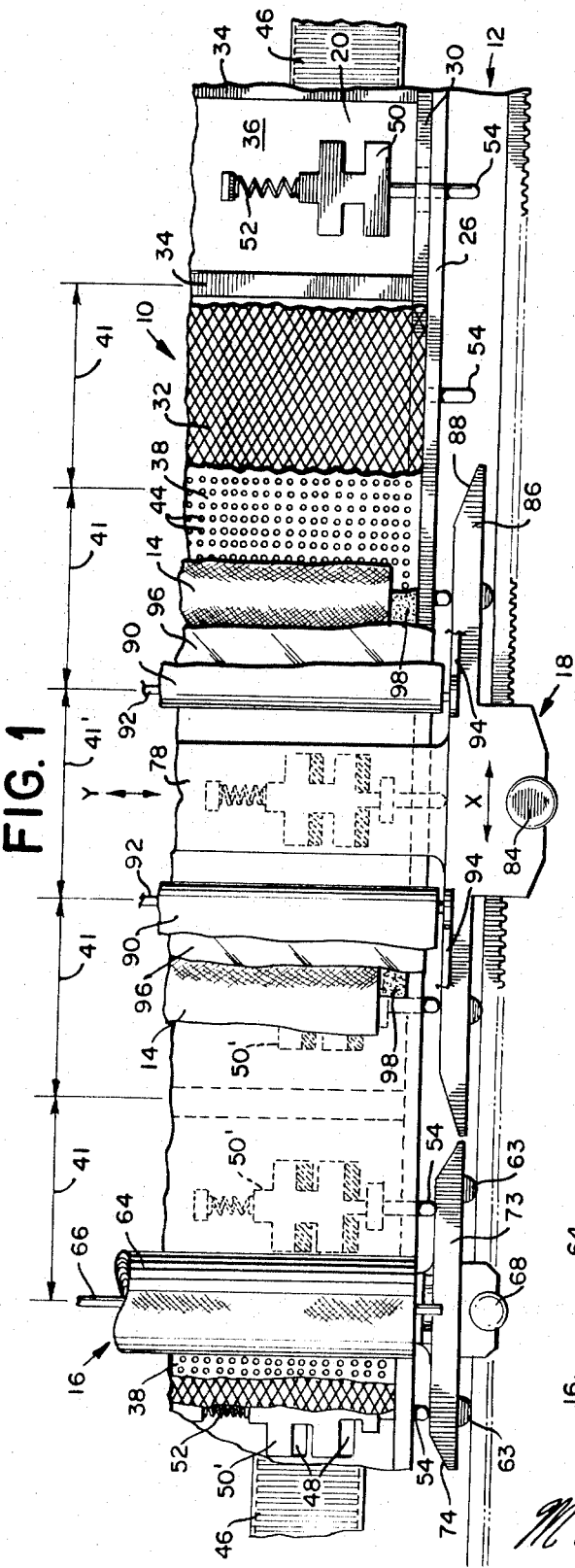
FIG. 1 is a fragmentary plan view of apparatus embodying the present invention and illustrating a method for practicing the invention.
Figure 2:
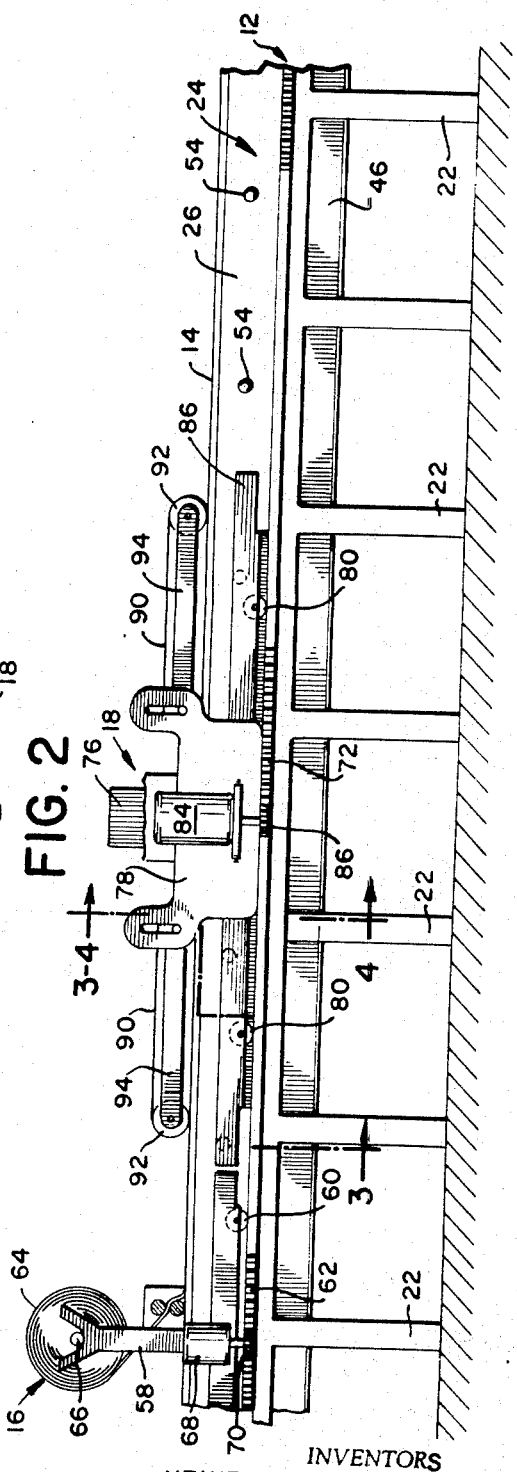
FIG. 2 is a fragmentary side elevational view of the apparatus of FIG. 1.

Turning now to the drawings, and first considering FIGS. 1 to 4, an apparatus for working on fabric and other sheet materials in accordance with the method of the present invention is indicated generally at 10. The apparatus 10 is particularly adapted to spread or layup sheet material and to cut the material in response to input signals supplied to the apparatus by an associated control means such as, for example, a computerized or numerically controlled controller (not shown). More particularly, the apparatus 10 comprises an elongated vacuum holddown table indicated generally by the reference numeral 12 to provide support for a layup 14 which comprises layers of sheet material arranged in face-to-face or face-up vertically stacked relation. A spreading tool indicated generally at 16 and supported for movement longitudinally of the table in response to signals supplied by the controller serves to spread sheet material to form the layup 14. A cutting tool designated generally by the reference numeral 18 is supported to traverse the surface of the table 12 in two coordinate directions indicated by the arrows X and Y in response to position signals supplied by the controller. The cutting tool may take various forms but preferably, and as shown, it includes a blade 19 supported for vertically reciprocating movement in cutting engagement with the layup 14. The blade 19 is movable along any line which may be straight or curved as required in cutting a garment component or the like and is further arranged for rotation about its own axis in a direction indicated by the arrow 9 and for vertical movement into and out of cutting engagement with the layup 14.

The apparatus 10 also includes means for applying vacuum to the hold-down table to position and smooth or remove wrinkles from the sheet material as it is spread and to hold it firmly in position on the table during the cutting operation. The latter means is responsive to longitudinal movement of either tool, as will be hereinafter further discussed.

Figure 4:
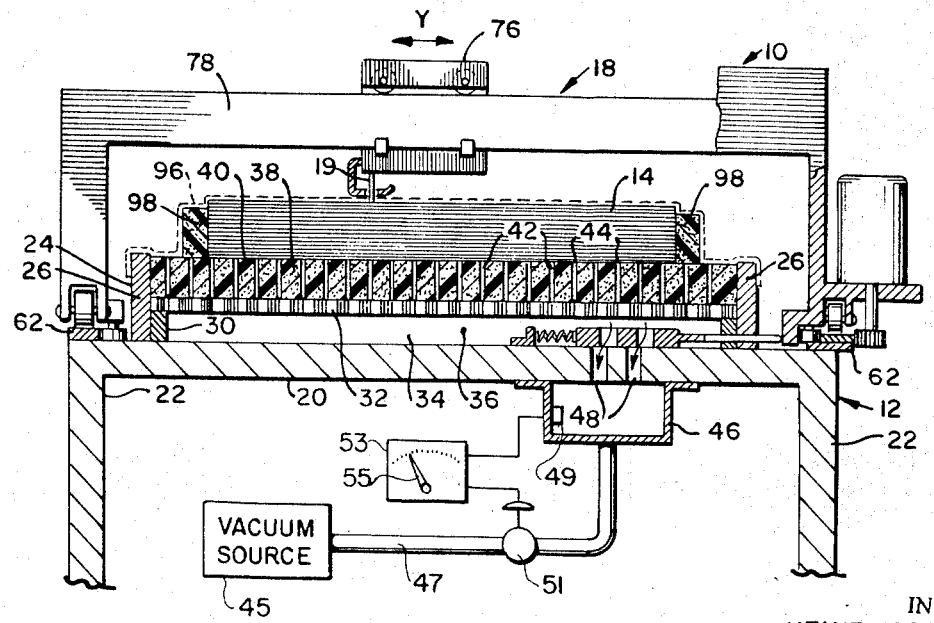
FIG. 4 is a sectional view taken generally along the line 4—4 of FIG. 2.

Considering the apparatus 10 in further detail, the table 12 comprises a generally horizontally disposed base plate 20 supported at convenient working height by a plurality of legs 22, 22. On the upper surface of the plate 20 there is mounted a generally rectangular frame 24 formed by longitudinally extending side members 26, 26 and transversely extending end members (not shown). A vertical spacing member 30 positioned inwardly adjacent each side member 26 extends longitudinally of the table between the end members to provide support for a perforated plate 32. Preferably, the plate 32 is made from expanded metal and spaced above the plate 20 and below the upper or free edge of the frame 24. A longitudinally spaced series of partitions 34, 34 extend transversely of the frame 24 between the spacers 30, 30 and the plates 20 and 32 to define a longitudinal series of chambers 36, 36 between the latter plates as best shown in FIG. 4.

A bed of material 38 is supported in the frame 24 by the plate 32 and has an upwardly facing fabric supporting surface 40 which includes a longitudinal series of fabric supporting zones 41, 41. Each zone 41 is associated with and located above a chamber 36. Various materials may be used to form the bed 38, but preferably it comprises a resilient low density cellular polyethylene plastic material which may be readily penetrated by the blade 19. The blade 19 is preferably adjusted to penetrate the table to assure accurate and efficient cutting of the lower layers comprising the layup. Ethafoam, a product of Dow Chemical Company, has proven particularly suitable as a bed material. The bed material includes a plurality of passageways passing therethrough for conducting vacuum from the chambers 36, 36 to the upper surface of the bed material which supports the material to be cut. If the bed material is porous, as for example a foamed plastic with an open cell structure, the porosity of the material may be used to provide these passageways. Preferably, however, the bed material is one which is substantially non-porous, as for example, a foamed plastic with a closed cell structure, and the vacuum transmitting passageways consist of vertically extending passageways 42, 42, as shown, drilled or otherwise formed in the bed and passing therethrough generally perpendicular to the supporting surface. As shown, each passageway at its upper end or in the plane of the supporting surface 40 terminates in an opening 44.

Vacuum is applied to the table 12 by a vacuum chamber or duct 46 which extends longitudinally of the table below the plate 20 and is connected to a suitable vacuum source 45 through a conduit 47, the vacuum source preferably being one of high flow rate capacity. A longitudinally spaced series of slots or ports 48, 48 formed in the plate 20 communicate with the duct 46 and with each of the chambers 36, 36. In the illustrated embodiment, two ports 48, 48 communicate with each chamber 36.

Application of vacuum to the table 12 is controlled by a plurality of slide valves 50, 50 mounted on the upper surface of the plate 20. Each valve 50 is associated with a pair of ports 48, 48 and is arranged for transverse sliding movement on the plate 20 between open and closed positions indicated respectively at 50 and 50' in FIG. 1. Each valve is biased toward its closed position by a spring 52 and movable to its open position in response to force applied to the free end of an associated control rod or follower 54 which projects from the body of the valve, passes through an associated spacer 30 and side member 26, and projects outwardly beyond the side member. Control means are also provided for maintaining the vacuum applied to the passageways of the bed 38 at a substantially constant predetermined level despite changes in the flow rate of air therethrough. As shown in FIG. 4 this control means comprises a pressure sensor 49 in the vacuum duct 46, a control valve 51 in the conduit 47 and a controller 53. The controller 53 is responsive to the sensor 49 to operate the valve 51 as required to maintain a constant level of vacuum in the duct 46, the level maintained being adjustable by means of a set-point adjustment member 55 on the controller 53.

The spreader 16 is of a generally conventional type for face-to-face or face-up spreading of rolled fabric or other sheet material and comprises a supporting carriage 58 arranged to travel on rollers 60, 60 which engage ways 62, 62 fastened to and extending longitudinally of the table 12. Additional rollers 63, 63 mounted on the carriage 58 engage the innder sides of the ways 62, 62 to maintain the carriage in longitudinal alignment with the table 12. A roll or bolt of material designated at 64 is supported by a rod 66 which extends transversely of the carriage 58. A drive motor 68 mounted on the carriage and responsive to input signals from the controller carries a pinion 70 which engages a longitudinally extending rack 72 mounted on the table 12 to drive the carriage in the X direction. The carriage also has an elongated cam element 73 which includes a cam surface 74 adapted to engage and move each successive follower 54 as the carriage 58 moves longitudinally of the table. The cam surface 74 is of somewhat greater longitudinal extent than the longitudinal distance between three successive followers 54, 54. Thus, as the carriage 58 moves longitudinally of the table 12 the followers 54, 54 are successively engaged and each valve 50 is moved to and held in its open position until the cam surface 74 engages and opens the next successive valve 50.

The blade 19 is driven in cutting engagement with the layup 14 by a drive unit 76 supported for movement transversely of the table 12 by a movable supporting carriage 78 which bridges the table. The drive unit 76 is arranged to raise and lower the blade 19 relative to the table surface 40 and to move in its Y and θ directions in response to input signals from the controller as the carriage simultaneously moves the drive unit and blade in the X direction. Each end of the carriage is supported by a pair of rollers 80, 80 which travel on an associated way 62. A drive motor 84 secured to the carriage 78 and responsive to input signals from the computer carries a pinion 86 which engages the rack 72 to drive the carriage in the X direction. The carriage 78 also includes an elongated cam element 86 secured to one side thereof which has a cam surface 88 for engaging the followers 54, 54 to move the valves 50, 50 to their open positions. The longitudinal dimension of the cam surface 88 is at least equal to the longitudinal distance between four successive cam followers 54, 54. Thus, when the valve 50 associated with the cutting zone in which the blade 19 is operating is in its open position the valves associated with the zones adjacent the cutting zone will also be open. In FIG. 1 the cutting zone is designated at 41'.

Preferably, the cutting tool carries at least one panel adapted to overlie an associated portion of the upper surface of the layup 14 as the cutting tool moves longitudinally of the table 12. The illustrated apparatus 10 includes two longitudinally spaced apart panels or endless belts 90, 90 positioned at opposite sides of the blade 19. Each belt 90 is made from non-permeable plastic and supported by a pair of longitudinally spaced rollers 92, 92 journaled for rotation about transversely extending axes by arms 94, 94 which project longitudinally and in opposite directions from opposite sides of the carriage. The belts 90, 90 are preferably arranged for vertical adjustment relative to the carriage to accommodate layups or stacks of material of various height, so that the belts will rest on the upper surface of the material as the cutting tool 18 travels longitudinally relative to the table 12.

Considering now the operation of the apparatus 10, the spreading tool 16 and the cutting tool 18 are independently operative and when one of the tools is in operation the other is or may be positioned in an inactive area at one or the other end of the table 12, or, if desired, a transfer device (not shown) may be provided to move the tool not in use to a suitable storage position away from the table.

The spreading tool 16 moves in the X direction in response to input signals from the controller as sheet material is paid out from the bolt 64 in conventional manner. As the spreading tool advances each valve 50 in its path of travel is successively opened by the cam element 73 so that vacuum is applied to a table zone 41 in which the material is being spread. Each valve 50 remains in its open position until the cam element 73 engages and opens the next successive valve. Thus, the vacuum hold-down table 12 exerts a substantially continuous smoothing effect upon sheet material as it is spread longitudinally of the table surface. When the material is of a porous type, such as a woven fabric, vacuum acts upon an associated region of the lower surface of the fabric as it is brought into contact with the table surface 40 and also acts through the lower layers of fabric to exert smoothing effect upon an associated region of the lower surface of each successive upper layer comprising the layup.

Figure 3:
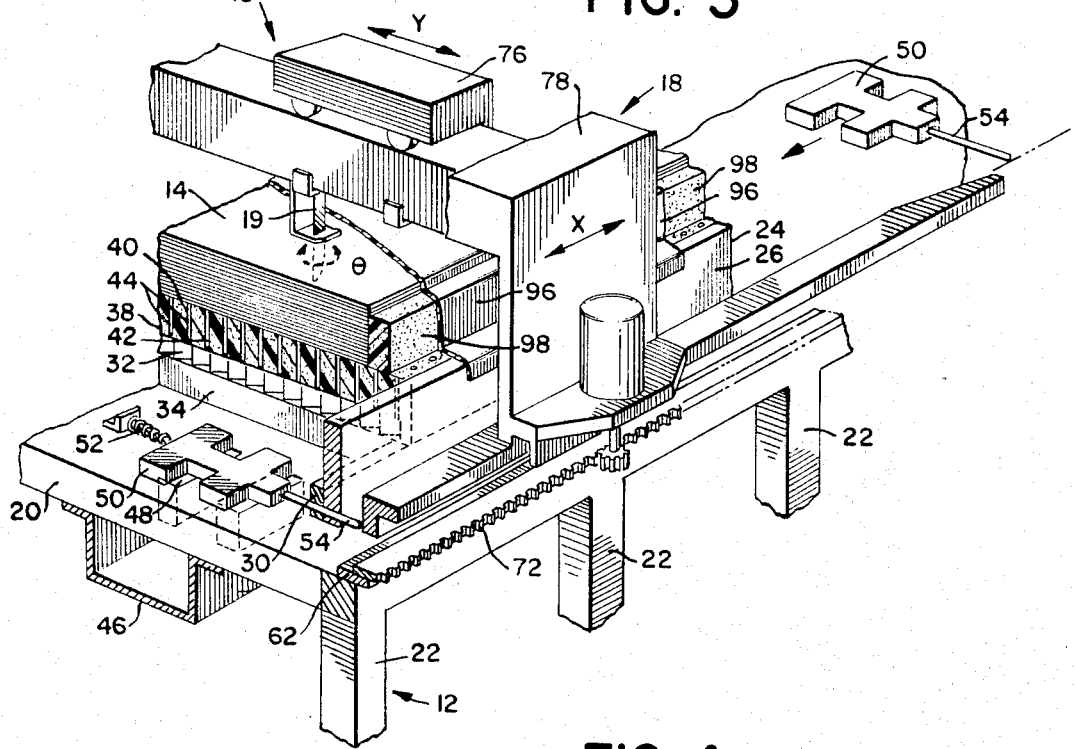
FIG. 3 is a fragmentary perspective view partially in section taken generally along the line 3—3 of FIG. 2.

When a layup of porous material is to be cut a substantially imperforate or air-impervious expendable panel 96 which may be readily cut by the blade 19 is preferably first positioned in overlying relationship with the layup as shown in FIGS. 3 and 4. The panel is imperforate in the sense that it is substantially impervious to the passage of air therethrough. Relatively thin flexible plastic film, such as polyethylene sheet, has proven particularly satisfactory for this purpose. When desirable to support fabric layups with thin or weak edges, longitudinally extending guide blocks 98. 98 are positioned adjacent the side edges of the layup before the panel 96 is positioned thereon. These blocks are preferably made of the same material as the bed 38, and in any event are made of a material which may readily be cut into by the cutting tool without damage to the tool. These guide blocks are not, however, necessary in all cases and when not used the panel 96 is spread so as to merely drape over the edges of the fabric layup. In either event the panel is preferably of such a size and so spread as to extend transversely across the full width of the layup, down both sides thereof and across a portion of the supporting surface 40 of the bed adjacent the sides of the layup, thereby completely enveloping the layup.

At the start of the cutting process, the blade 19 is elevated or raised to a position above and moved to a preselected starting position relative to the upper surface of the layup. Thereafter, the blade is lowered to penetrate the layup and the cutting cycle proceeds in accordance with its programmed pattern. As the carriage 78 moves in the X direction, it will be noted that the valve 50 associated with the cutting zone 41' is in its open position so that vacuum is applied to the surface 40 in the latter zone. It will be further noted that the valves 50, 50 associated with zones 41, 41 immediately adjacent the cutting zone 41' will also be in their respective open positions so that vacuum is also applied in latter zones. Vacuum is applied to both the lower surface of the porous material to be cut and through the latter material to the lower surface of the panel 76.

Vacuum is therefore applied to the lower surface of the material to be cut and when such material is porous the vacuum passes through and around such material to the lower surface of the air-impervious panel 76 and causes such panel to be attracted toward the supporting surface to compress or compact the layup. When the material of the layup is non-porous, the vacuum nevertheless passes around such material and applies a vacuum to the lower surface of the panel 76 to produce the same compressing or compacting effect.

We claim:

1. A method for spreading a length of flexible sheet material on a supporting surface, said method comprising the steps of: providing a length of sheet material to be spread, providing a substantially flat supporting surface having an area at least as great as the area of said length of sheet material to be spread, placing one end portion of said length of sheet material onto said supporting surface, retaining said one end portion of said length of sheet material in place relative to said supporting surface and then, progressively and longitudinally of said supporting surface and of said length of sheet material, bringing successive portions of said length of sheet material into contact with successive portions of said supporting surface until said entire length of sheet material is spread over said supporting surface in a plane parallel thereto, and during said step of bringing successive portions of said length of sheet material into contact with successive portions of said supporting surface creating a vacuum adjacent said supporting surface at least over a region thereof including the line along which said sheet material encounters said supporting surface at the time.

2. A method for spreading a length of flexible sheet material on a supporting surface as defined in claim 1 further characterized by creating said vacuum in such a manner that said region over which it appears extends a substantial distance rearwardly and forwardly of said line of encounter.

3. A method for spreading a length of flexible sheet material on a supporting surface as defined in claim 2 further characterized by said supporting surface being divided into a number of lengthwise regions, and selectively creating vacuum over less than all of said regions at any one time during the movement of said regions at any one time during the movement of said line of encounter along the length of said supporting surface, the regions to which vacuum is applied including said line of encounter.

4. A method for spreading a length of flexible sheet material on a supporting surface as defined in claim 1 further characterized by providing said length of sheet material in a roll thereof, and said step of bringing successive portions of said lengths of sheet material into contact with successive portions of said supporting surface being performed by moving said roll longitudinally of said supporting surface and simultaneously therewith unrolling said sheet material therefrom and guiding it to said supporting surface.

5. A method for spreading a length of flexible sheet material on a supporting surface as defined in claim 4 further characterized by creating said vacuum only in the vicinity of said line of encounter.

\* \* \* \* \*

PO-1050
(5/69)

UNITED STATES PATENT OFFICE
CERTIFICATE OF CORRECTION

Patent No. 3,672,661          Dated June 27, 1972

Inventor(s) Heinz Joseph Gerber and David R. Pearl

It is certified that error appears in the above-identified patent and that said Letters Patent are hereby corrected as shown below:

Col. 6, line 2, delete "said regions at any one time during the movement of".

Signed and sealed this 24th day of October 1972.

(SEAL)
Attest:

EDWARD M. FLETCHER, JR.          ROBERT GOTTSCHALK
Attesting Officer          Commissioner of Patents